Nov. 19, 1968    G. SCHMELING    3,411,666
METHOD AND APPARATUS FOR SUCCESSIVELY METERING IDENTICAL
QUANTITIES OF PARTICULATE MATERIAL
Filed June 8, 1966

INVENTOR
Gerhard Schmeling
BY
Michael S. Striker
ATTORNEY

United States Patent Office 3,411,666
Patented Nov. 19, 1968

3,411,666
METHOD AND APPARATUS FOR SUCCESSIVELY METERING IDENTICAL QUANTITIES OF PARTICULATE MATERIAL
Gerhard Schmeling, Cologne-Dellbruck, Germany, assignor to Bergwerksverband GmbH, Essen, Germany
Filed June 8, 1966, Ser. No. 556,136
Claims priority, application Germany, June 9, 1965, B 82,320
11 Claims. (Cl. 222—1)

ABSTRACT OF THE DISCLOSURE

An apparatus for successively metering identical quantities of particulate material includes a container having an upper open end and an edge portion which at least partly defines this open end. Feed means is arranged for feeding particulate material through the open end into the container so that the material will substantially fill the same and form in an upper portion of the container a cone having a cone angle coincident with the natural angle of repose of the material. Fluidizing means is associated with the container for temporarily fluidizing the material therein so that a predetermined quantity of the material will flow, while the material is in fluidized state, over the edge portion out of the container.

---

Figure 1:
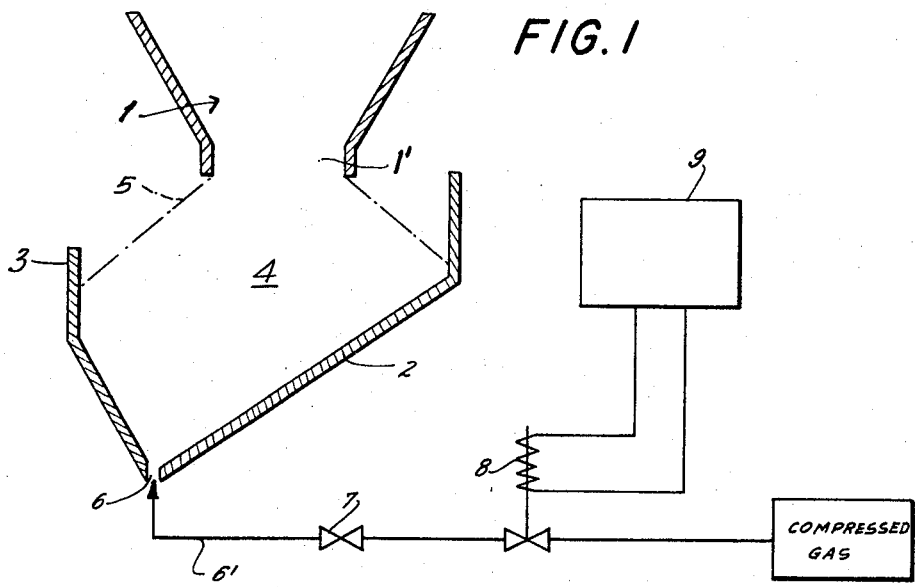

The present invention relates to a method for successively measuring identical quantities of particulate material. More specifically, the invention relates to such a method in which the particulate material is withdrawn from a container in identical quantities. The invention also relates to an apparatus for carrying out the method.

A variety of methods and devices is known for measuring particulate material, and specifically particulate material of small grain. All devices of this type which are known to me operate on a mechanical basis, some of them for instance by utilizing vibrating belts, feed screws, and the like. Other of these devices utilize valves, gates or sliding members for regulating the flow of the particulate material to thereby achieve measurement of identical quantities thereof.

While these prior-art devices are generally satisfactory for the purpose at hand, namely measurement of quantities of particulate material, they do suffer from disadvantages. Specifially, not all of the devices are capable of handling all types of particulate material, particularly if the latter is very hot. Furthermore, the abrasion effect of many particulate materials will wear down those parts of the measuring devices which come into contact with the materials, at a very high rate. This necessitates that the devices be provided with special wear inserts which can and must be exchanged frequently, and that all bearings, bushings etc. be made completely dust-tight to prevent them from being damaged. In the case of very hot particulate materials, it is also necessary to construct the prior-art devices from special heat-resistant materials, and in many cases it is even necessary to provide additional cooling means for at least certain portions of the devices.

All of this, obviously, results in rather expensive constructions and in high maintenance costs. The reliability of prior-art devices is, naturally, adversely affected under such circumstances irrespective of how well or how expensively they are constructed.

It is therefore a general object of the present invention to overcome the above-mentioned drawbacks of the prior art.

A more specific object of the present invention is to provide a novel method of successively metering identical quantities of particulate material.

A still more specific object of the invention is to provide such a method which is considerably more simple than methods which are known to me from the prior art.

It is further an object of the present invention to provide an apparatus for carrying out the above-set forth method.

A concomitant object of the present invention is to provide such an apparatus which does not rely for metering of the particulate material on mechanical means.

In accordance with one feature of my invention I provide a method of successively withdrawing identical quantities of particulate material from a container having an upper open end which is in part defined by an edge portion. In pursuance of this method I feed particulate material from above into the container so that the material substantially fills the same. When the container has been substantially filled the material forms in an upper portion of the container, a cone having a cone angle which coincides with the natural angle of repose of the particulate material. Such a cone will have a base which is located below the edge portion of the container. If I now temporarily fluidize the particulate material in the container, a predetermined quantity of the material will flow over the edge portion of the latter. This flow will continue for as long as the fluidized condition prevails and for as long as particulate material is available on a level higher than the edge portion of the container.

The apparatus for carrying out the method comprises a container having an upper open end and an edge portion which at least partly defines the open end. The apparatus further comprises feed means for feeding particulate material in downward direction through the open end of the container and into the latter so that the material will substantially fill the container. The material will thus form in the upper portion of the container a cone having a cone angle which is coincident with the natural angle of repose of the material, as mentioned above with reference to the method. Furthermore, I provide fluidizing means operatively connected with the container for temporarily fluidizing the material therein so that a specific quantity of the thus-fluidized material will flow over the aforementioned edge portion.

The most significant difference between the present method and apparatus and the prior art is that they do not rely on mechanical means for achieving metering of particulate material. Thus, there is no wear of parts and the construction of the novel apparatus is extremely simple, just as its operation is extremely reliable. In accordance with the invention the admission of gas into the container for purposes of fluidizing the particulate material will advantageously occur in a lower portion of the container, and the gas will be admitted so as to flow in upward direction through the container and through the material located therewithin.

The admission of gas will be intermittent and the amount of fluidized particulate material which will flow over the edge portion of the container is governed by the speed of the gas stream and/or the quantity of gas admitted into the container. This amount is further controlled by the period of time for which gas is admitted, and by the time intervals between the admission of gas.

Figure 2:
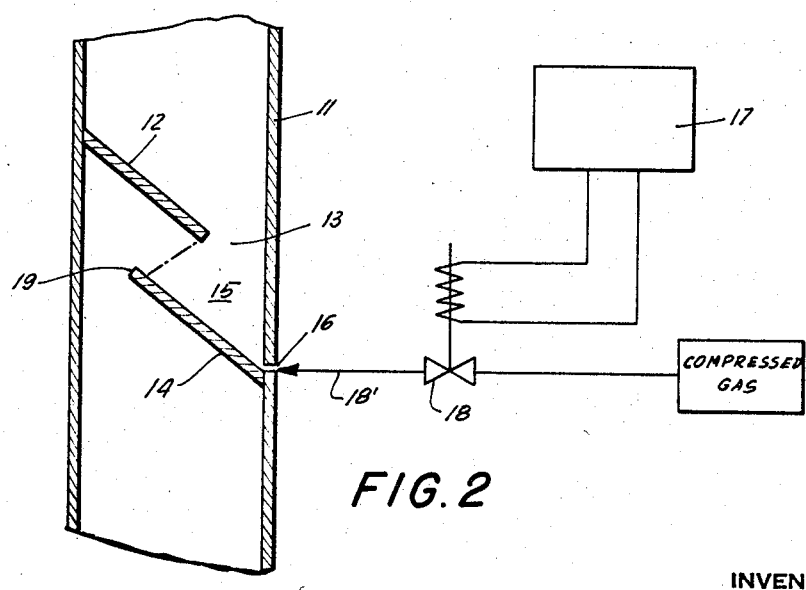

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a schematic presentation of one possible embodiment of an apparatus in accordance with my invention; and FIG. 2 is an equally schematic presentation of another possible embodiment of an apparatus in accordance with the invention.

Discussing now the drawing in detail, and first FIG. 1 thereof, it will be seen that there is provided a feed hopper 1 having a downwardly directed outlet 1'. Located beneath the feed hopper is a container 2 having an upper open end and having an edge portion 3 which partly defines the upper open end. The location of the outlet opening 1' of feed hopper 1 with respect to the circumferential edge portion of container 2 which defines the upper opening of the latter is such that particulate material which flows out of feed hopper 1 through the opening 1' thereof is incapable of flowing over the edge portion 3 of container 2, unless the material is fluidized.

When particulate material is admitted into container 2 through the outlet opening 1' of feed hopper 1, it will initially fill the container 2 as is indicated by reference numeral 4 which designates the particulate material located in container 2. The material will then form in the upper portion of the container 2 a cone which tapers in upward direction towards the outlet 1' and whose base is located downwardly of the edge portion 3. The cone angle of this cone coincides with the natural angle of repose of the particulate material. In other words, the material will taper from the cone base at a natural angle of repose (indicated by the broken lines 5) toward the outlet 1'.

An inlet opening 6 is provided in the lower portion of the container 2 and a conduit 6' connects the inlet opening 6 with a source of compressed gas. Interposed in the conduit 6' is a valve 7 which regulates the quantity of gas to be admitted through the opening 6 into the container 2. Since the gas admission is to be intermittent I further provide a magnetic valve 8 which is also arranged in the conduit 6' to block and unblock the same for intermittent passage of gas therethrough. The magnetic valve 8 is in turn controlled by a suitable control device, which in the present instance is a signal generator 9 of any well known type. This signal generator 9 permits selecting the duration of gas admission, and also the number of times gas is admitted into the container 2 during a given period of time.

In operation of the device, the gas is admitted in upward direction into the container 2 and fluidizes the particulate material 4 therein. This fluidization phenomenon is well known and need not be further described. As soon as fluidization has occurred, particulate material will begin to flow over the edge portion 3 and while fluidization prevails this flow will continue until all such particulate material as is located at a level above the edge portion 3 has passed over the latter. Of course, the flow will stop as soon as fluidization of the material is terminated by interrupting the admission of gas through the opening 6. The outlet opening 1' of feed hopper 1 may be provided with a suitable closure means which may be closed whenever the material in container 2 has reached the natural angle of repose as indicated with reference numeral 5. However, this is not absolutely necessary since the flow of material will cease automatically whenever this natural angle of repose has been reached. Thus, the presence or absence of such a closure means will be largely dictated by whether it is desirable that during the period of time during which the material 4 is fluidized, additional material be permitted to enter the container 2 since, if no closure means is provided, material will continuously flow through the outlet opening 1' while the material 4 in the container 2 is fluidized. Obviously if the outlet opening 1' is closed by a suitable closure means, no material will flow into the container 2 as long as the closure means is closed.

FIG. 2 shows a modification of the apparatus of FIG. 1. In FIG. 2 the apparatus comprises a vertical or at least substantially vertical conduit 11 provided with a first downwardly inclined plate 12 arranged within the conduit in such a manner that an opening or passage 13 is formed between its lower end and the wall of the conduit 11. The material will flow downwardly in the conduit 11 and through the opening 13 which corresponds to the outlet opening 1' of feed hopper 1 in FIG. 1. Arranged downwardly of the first plate 12 is a second plate 14 which forms with the wall of conduit 11 a space 15, corresponding to the container 2 shown in FIG. 1. As the material passes through the opening 13 into the space 15 it will fill the latter until it forms therewithin the natural angle of repose 5. Compressed gas is admitted through an inlet opening 16 provided in a lower portion of the space 15, and its admission is governed by a magnetic valve 18 arranged in a conduit 18' and controlled by a signal generator 17. The operation of this second apparatus is the same as the one shown in FIG. 1 and it will be obvious from the description of the former whenever gas is admitted through the inlet opening 16 and the material in space 15 is fluidized, identical quantities of such fluidized material will flow over the edge portion 19 and will thus be metered.

It should be noted that as the flow of gas is interrupted, the particulate material in the respective containers will leave the fluidized stage within seconds or even fractions of seconds. If the respective outlet openings of the respective feed-hoppers are not provided with closure means it is obvious that additional material will begin to enter the respective containers as soon as fluidization occurs. Conversely, as soon as fluidization terminates, material newly entering through the respective outlet openings of the feed hoppers will again accumulate in the containers until it had reached its natural angle of repose, whereupon further flow of material will then cease until a new fluidization episode occurs.

It will be understood that each of the elements described above, or two or more together, may also find a useful application in other types of a method and apparatus for successively metering identical quantities of particulate material differing from the types described above.

While the invention has been illustrated and described as embodied in a method and apparatus for successively metering identical quantities of particulate material, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of successively withdrawing identical quantities of particulate material from a container having an upper open end which is in part defined by an edge portion, comprising the steps of feeding particulate material from above into the container so that the material will substantially fill the same and will in an upper portion of the container form a cone partly extending above said edge portion and having a cone angle coinciding with the natural angle of repose of the material, said cone having a base located below the edge portion; temporarily introducing a gaseous medium under pressure into said particulate material to fluidize the same whereby, while the same is in fluidized state, a predetermined quantity of said particulate material forming said cone will flow over the edge portion of said container; ceasing fluidization of said material and in automatic response thereto feeding additional material into said container to replace said predetermined quantity and in order that the material will again form said cone; and repeating the second step so as to again withdraw a predetermined quantity of said material corresponding to the first-mentioned predetermined quantity.

2. A method as defined in claim 1, wherein the step of feeding material into the container comprises feeding the material continuously.

3. A method as defined in claim 1, wherein the step of fluidizing the material comprises intermittently admitting compressed gas into a lower portion of the container and in upward direction.

4. A method as defined in claim 3, wherein the size of said predetermined quantity is regulated by the amount of gas admitted.

5. A method as defined in claim 3, wherein the size of said predetermined quantity is regulated by the speed at which said gas is admitted.

6. A method as defined in claim 3, wherein the size of said predetermined quantity is regulated by the duration of admission of gas and the time interval between successive admissions.

7. Apparatus for successively measuring identical quantities of particulate material, comprising a container having an upper open end and an edge portion at least partly defining said open end; feed means for feeding particulate material in downward direction through said open end and into said container so that the material will substantially fill the same and will in an upper portion of said container form a cone having a cone angle coincident with the natural angle of repose of the material; and means operatively connected with said container for temporarily introducing a gaseous medium under pressure into said container for fluidizing the material therein whereby, while the material is in fluidized state, a predetermined quantity of the material will flow over said edge portion of said container out of the same.

8. Apparatus as defined in claim 7, wherein said container has a lower end portion; and wherein said means operatively connected with said container comprises a source of compressed gas and a conduit connected with said source and communicating with said lower end portion for admitting the gas thereinto in upward direction.

9. Apparatus as defined in claim 8; and further comprising actuating means for admitting said gas for predetermined periods of time and at predetermined time intervals.

10. Apparatus as defined in claim 9; wherein said actuating means comprises valve means arranged to permit and obstruct admission of said gas into said container.

11. Apparatus as defined in claim 9, wherein said actuating means comprises valve means arranged to permit and obstruct admission of said gas into said container; and further comprising signal generator means operatively connected with said valve means for selectively actuating the latter for said predetermined periods of time and at said predetermined time intervals.

References Cited

UNITED STATES PATENTS

| 2,353,346 | 7/1944 | Logan | 222—195 X |
| 3,097,828 | 7/1963 | Grün | 222—195 X |

FOREIGN PATENTS

| 981,775 | 1/1951 | France. |
| 225,025 | 11/1924 | Great Britain. |
| 532,640 | 11/1954 | Belgium. |

ROBERT B. REEVES, *Primary Examiner.*

F. R. HANDREN, *Assistant Examiner.*